UNITED STATES PATENT OFFICE.

GEDEON RICHTER, OF BUDAPEST, AUSTRIA-HUNGARY.

PROCESS FOR THE FORMATION OF CALCIUM SALT OF ACETYLSALICYLIC ACID.

1,058,904. Specification of Letters Patent. Patented Apr. 15, 1913.

No Drawing. Application filed September 13, 1912. Serial No. 720,177.

*To all whom it may concern:*

Be it known that I, GEDEON RICHTER, a citizen of the Kingdom of Hungary, residing at Budapest, Austria-Hungary, have invented a certain new and useful Improvement in the Process for the Formation of Calcium Salt of Acetylsalicylic Acid, of which the following is a specification.

This invention relates to a new process for the formation of calcium salt of acetylsalicylic acid, and has for its object to render the process to the utmost simple and inexpensive.

The alkali salts of acetylsalicylic acid are produced, in the known way, by agitating solutions or suspensions of acetylsalicylic acid in methyl alcohol or acetone with the carbonates of the alkalis and precipitating the alkali salt of the acetylsalicylic acid from the filtered solution with ether. It is not possible to produce calcium salt in this manner as in organic solvents the acetylsalicylic acid reacts with calcium carbonate with great difficulty and the calcium salt of acetylsalicylic acid which is insoluble in the solvents in question cannot be separated from the calcium carbonate in excess. Accordingly it has hitherto been necessary to proceed by the roundabout method of first of all producing a solution of lithium salt in methyl alcohol and precipitating it with a calcium chlorid solution, the calcium salt of the acetylsalicylic acid being thereby separated out and the lithium chlorid remaining in solution.

Now I have found that in grinding acetylsalicylic acid with a little water and gradually adding calcium carbonate the calcium salt of the acetylsalicylic acid forms directly. When the resultant aqueous solution is filtered off from the calcium carbonate in excess and mixed with from three to four times the quantity of methyl alcohol the calcium salt of the acetylsalicylic acid is separated out in a very pure form.

As in producing the alkali salt of acetylsalicylic acid it is essential to avoid water, as otherwise saponification might readily occur in splitting off acetic acid, it is very surprising that calcium salt should behave quite differently in this respect. This unexpected behavior however, renders possible a very simple and inexpensive production of calcium salt and represents a very important advance in the art.

Barium salt and strontium salt can of course be prepared in the same way, but these salts present no importance as barium salt exerts a toxic action and strontium salt is highly hygroscopic.

In order to illustrate the new process more fully the following example is given, the parts being by weight: 100 parts of acetylsalicylic acid are mixed with 200 parts of water, then 35 parts of calcium carbonate are added to the mixture gradually while constantly agitating it. As soon as the development of carbon dioxid ceases, the mixture is quickly filtered and the filtrate mixed with three to four times its quantity of alcohol or methyl alcohol. The calcium salt of the acetylsalicylic acid separates out as a white precipitate, which is filtered off as quickly as possible, washed with alcohol and dried at a moderate temperature.

Having thus fully described my invention, what I claim as new, and desire to secure by Letters Patent, is—

1. A process for the formation of calcium salt of acetylsalicylic acid consisting in first mixing acetylsalicylic acid with water, then adding to the mixture calcium carbonate while agitating it until the development of carbon dioxid ceases, then filtering the aqueous solution, then treating the filtrate with alcohol whereby the calcium salt of acetylsalicylic acid separates out as a white precipitate, substantially as described.

2. A process for the formation of calcium salt of acetylsalicylic acid consisting in first grinding acetylsalicylic acid in water, then gradually adding calcium carbonate thereto until the development of carbon dioxid ceases, then quickly filtering the solution, and finally precipitating the resulted calcium salt from the filtered solution with methyl alcohol, substantially as described.

In testimony whereof I have affixed my signature in presence of two witnesses.

GEDEON RICHTER.

Witnesses:
 HUGH KEMÉNY,
 GILES SCHWARZ.